United States Patent [19]
Sato

[11] Patent Number: 6,119,220
[45] Date of Patent: *Sep. 12, 2000

[54] METHOD OF AND APPARATUS FOR SUPPLYING MULTIPLE INSTRUCTION STRINGS WHOSE ADDRESSES ARE DISCONTINUED BY BRANCH INSTRUCTIONS

[75] Inventor: Toshinori Sato, Kanagawa-ken, Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/015,520

[22] Filed: Jan. 29, 1998

[30] Foreign Application Priority Data

Jan. 30, 1997 [JP] Japan ................. P09-016870

[51] Int. Cl.$^7$ ........................................ G06F 9/38
[52] U.S. Cl. ................ 712/235; 712/200; 712/214
[58] Field of Search ..................... 712/234, 235, 712/236, 237, 238, 239, 207, 51, 1, 125, 240, 23, 200, 214, 210

[56] References Cited

U.S. PATENT DOCUMENTS 4,742,451  5/1988  Bruckert et al. ................. 712/235
4,974,154  11/1990  Matsuo ............................ 712/240
5,764,946  6/1998  Tran et al. ....................... 712/239
5,774,710  6/1998  Chung ............................. 712/238
5,854,943  12/1998  McBride et al. .................. 710/51
5,954,816  9/1999  Tran et al. ....................... 712/237

OTHER PUBLICATIONS

Microarchitecture Support for Improving the Performance of Load target Prediction by Chung–Ho Chen & Akida Wu, Apr. 12.

*Primary Examiner*—John A. Follansbee
*Assistant Examiner*—Walter Benson
*Attorney, Agent, or Firm*—Foley & Lardner

[57] ABSTRACT

An apparatus for supplying instructions to a processor has an instruction cache (1) and a branch target buffer (33). The branch target buffer stores instructions in order of execution achievable if a branch instruction is taken. The instructions in the branch target buffer are arranged before a branch predictor (35) makes a prediction whether or not the branch instruction is taken. If the prediction tells that the branch instruction will be taken, the instructions in the branch target buffer are supplied to an instruction decoder (9). If the prediction tells that the branch instruction will not be taken, instructions in the instruction cache are supplied to the instruction decoder.

12 Claims, 16 Drawing Sheets

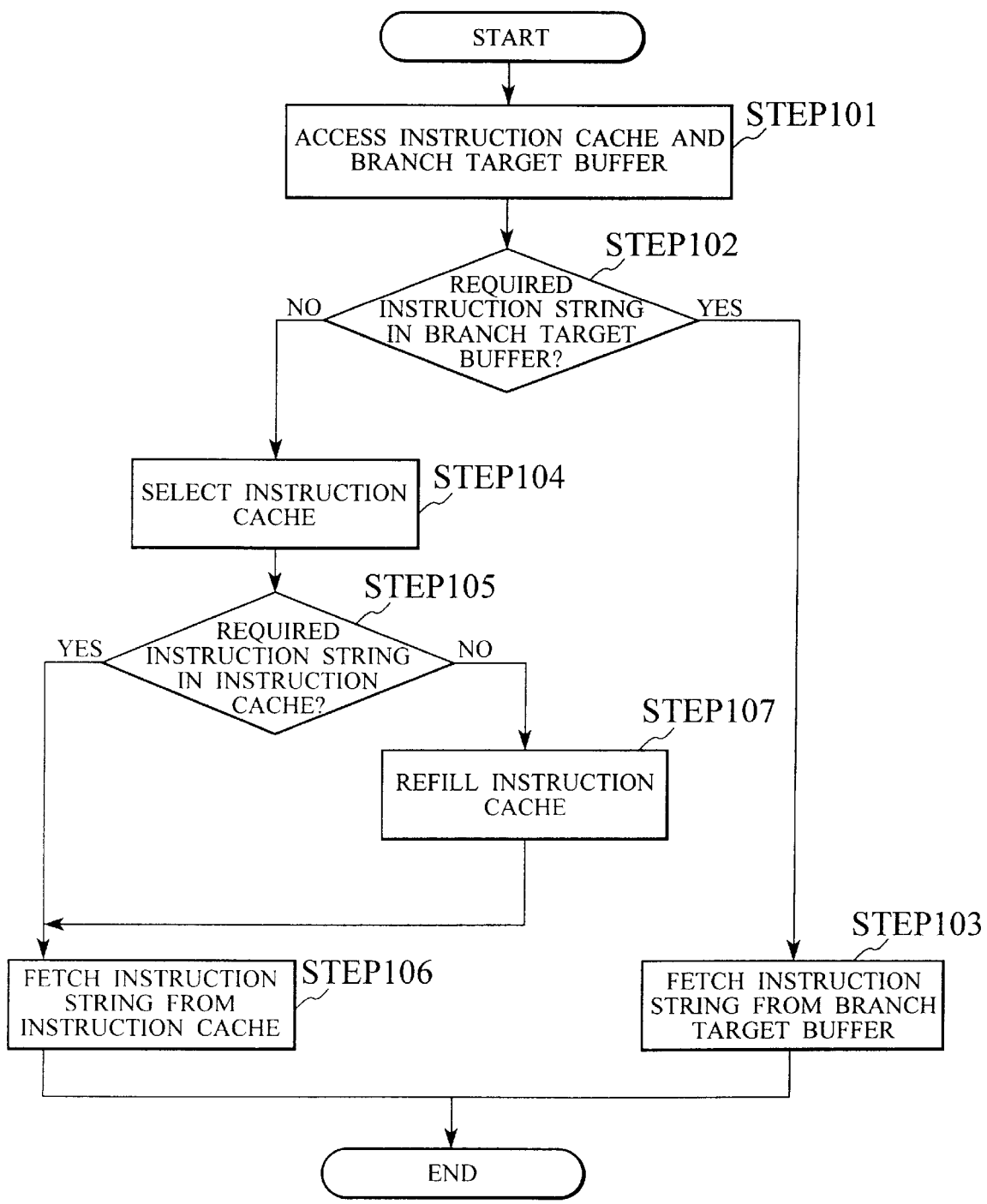

METHOD OF AND APPARATUS FOR SUPPLYING MULTIPLE INSTRUCTION STRINGS WHOSE ADDRESSES ARE DISCONTINUED BY BRANCH INSTRUCTIONS

BACKGROUND OF THE INVENTION

1. Field of the Invention

The present invention relates to a method of and an apparatus for supplying instructions to a processor.

2. Description of the Prior Art

Recent high-performance processors employ many functional blocks to improve the performance thereof. These functional blocks must efficiently operate to increase the operation efficiency and performance of the processors.

To efficiently operate the functional blocks, it is necessary to let them simultaneously execute as many instructions as possible. The degree of simultaneous execution of instructions is called ILP (instruction level parallelism). The higher the ILP of functional blocks, the higher the performance of the processors that employ the functional blocks.

The ILP is greatly dependent on the size of a basic block of instructions. The basic block is a string of instructions that include no branch instruction or branch target instruction. A program to be executed by a processor is divided into basic blocks according to branch and branch target instructions. Generally, a larger basic block results in a higher ILP.

FIG. 13 is a block diagram showing a RISC (reduced instruction set computer) processor according to a prior art.

This processor consists of an instruction cache 1 for temporarily storing instructions, a data cache 3 for temporarily storing operand data, a main memory 5 for storing programs and data, a program counter 7 for latching the address of an instruction to execute, an instruction decoder for decoding an instruction and generating various control signals, functional units 11 for carrying out various operations, and a register file 13 for temporarily storing data used by the functional units 11.

The processor uses an address in the program counter 7 to access the instruction cache 1 and fetch instructions therefrom. The fetched instructions are sent to the instruction decoder 9, which decodes the instructions. According to the decoded instructions, the functional units 11 carry out operations with the use of data stored in the register file 13. When needing data stored in the main memory 5, the processor accesses the data cache 3 and transfers the needed data from the data cache 3 to the register file 13.

Most of recent programs except numerical calculation programs involve many branch instructions to reduce the size of each base block of instructions. It is difficult, therefore, to increase the ILP.

The instruction cache 1 contains cache lines so that instructions in one cache line may simultaneously be read out of the instruction cache 1. It is impossible to simultaneously read two instruction strings belonging to two base blocks that are stored in two different cache lines in the instruction cache 1. In this case, the two instruction strings must separately be read, rearranged, and combined.

Accordingly, the conventional processor is very low in instruction supply efficiency, and therefore, is incapable of realizing high ILP and high performance.

To solve this problem, T. M. Conte et al has proposed a collapsing buffer in "Optimization of Instruction Fetch Mechanism for High Issue Rate," Proceedings of the 22nd Annual International Symposium on Computer Architecture, pp. 333–344, 1995. This technique simultaneously supplies an instruction string made of several base blocks to a processor. This is impossible for the prior art of FIG. 13 to achieve.

If one cache line includes a base block serving as a branch source and another includes a base block serving as a branch target, the collapsing buffer simultaneously accesses the two cache lines, removes instructions that are not executed from the instruction strings in the cache lines, and provides an instruction string made of the two base blocks that are continuous to each other.

Techniques similar to the above disclosure have been proposed by S. Dutta et al in "Block-Level Prediction for Wide Issue Superscalar Processors," Proceedings of 1st International Conference on Algorithms and Architectures for Parallel Processing, pp. 143–152, 1995, by A. Seznec et al in "Multiple-Block Ahead Branch Predictors," Proceedings of Architectural Support for Programming Languages and Operations Systems, 1996, and by S. Wallace in "Instruction Fetching Mechanism for Superscalar Microprocessors," Proceedings of Euro-Par, 1996.

Each of these techniques predicts the address of a branch target instruction, simultaneously accesses cache lines that store a branch source instruction string and a branch target instruction string, and provides an instruction string made of two base blocks.

FIG. 14 is a block diagram showing a processor having the collapsing buffer, according to a prior art. The same parts as those of FIG. 13 are represented with the same reference marks and are not explained again.

The collapsing buffer 15 is arranged between an instruction cache 1 and an instruction decoder 9. A branch target buffer 17 receives an address from a program counter 7, and if an instruction specified by the address is a branch instruction, predicts the address of a branch target instruction. The branch target buffer 17 then provides the predicted address.

The instruction cache 1 receives the address from the program counter 7 as well as the predicted address from the branch target buffer 17, and the collapsing buffer 15 fetches two instruction strings from the addresses and rearranges and combines them.

The operation of rearranging and combining instruction strings by the collapsing buffer 15 will be explained in detail.

FIG. 15 shows the collapsing buffer 15 and the periphery thereof. The instruction cache 1 is divided into banks 19 and 21 each having access ports so that instructions having continuous addresses over two banks may simultaneously be accessed. Namely, two continuous base blocks may be accessed at the same time.

The collapsing buffer 15 consists of an interchange switch 23, a first instruction buffer 25, and a second instruction buffer 27. The interchange switch 23 receives two instruction strings from the banks 19 and 21 and rearranges them in order of execution. The first instruction buffer 25 specifies actually executed instructions in the rearranged instruction strings. The second instruction buffer 27 receives a string of the specified instructions and transfers it to the instruction decoder 9.

If the program counter 7 specifies an address where an instruction "c" is stored, a cache line containing a string of instructions a, b, c, and d including the instruction c in question is supplied from the bank 19 to the interchange switch 23. If the instruction "d" in this instruction string is a branch instruction, the branch target buffer 17 receives the address of the instruction d and determines a branch target address jumped from the branch instruction d.

If a branch target instruction at the branch target address is an instruction "f," a cache line containing a string of instructions e, f, g, and h including the instruction f in question is supplied from the bank 21 to the interchange switch 23. The interchange switch 23 rearranges the instruction string of a, b, c, and d and the instruction string of e, f, g, and h. Even if the addresses of the instructions a, b, c, and d are larger than those of the instructions e, f, g, and h, the interchange switch 23 rearranges them in order of a, b, c, d, e, f, g, and h because this is their execution order.

Then, the interchange switch 23 sends the instruction string of a to h to the first instruction buffer 25. The first instruction buffer 25 determines instructions to be executed actually. The actually executed instructions are c, d, f, and g, which are transferred to the second instruction buffer 27. The second instruction buffer 27 supplies these instructions to the instruction decoder 9.

The branch target buffer 17 receives an address from the program counter 7, and if the address corresponds to a branch instruction, predicts the address of a branch target instruction and issues the branch target address.

FIG. 16 shows the structure of the branch target buffer 17.

The branch target buffer 17 consists of an instruction address tag unit 29 for comparing an address in the program counter 7 with tag addresses, and a branch target address unit 31 for storing branch target addresses corresponding to the tag addresses.

The branch target buffer 17 compares an address in the program counter 7 with each of the tag addresses stored in the instruction address tag unit 29, and if the address in the program counter 7 agrees with any one of the tag addresses, provides a branch target address corresponding to the agreed tag address from the branch target address unit 31.

The instruction supply technique using the collapsing buffer has a problem of slowing a processor speed. This is because materializing this technique needs a plurality of branch target address prediction mechanisms such as branch target buffers and requires an instruction cache to be divided into banks. This results in increasing the quantity of hardware. In addition, instruction arranging mechanisms and instruction string combining mechanisms such as the collapsing buffer are necessary.

These hardware pieces have very intricate structures to elongate an instruction supply time. Since the speed of a processor is dependent on the instruction supply time, a long instruction supply time slows down the processor speed.

A slowdown in the processor speed may be stopped by increasing the number of pipeline stages. This, however, deteriorates the performance of the processor itself.

In the processor of FIG. 14, a process of picking up a branch target instruction out of the instruction cache 1 according to a branch target address provided by the branch target buffer 17 needs a certain time. This time is substantially equal to a usual time of picking up an instruction out of the instruction cache 1 according to an address provided by the program counter 7. If the address in the program counter 7 represents a branch instruction, a time that is twice as long as the usual time is needed to fetch a branch target instruction from the instruction cache 1. Namely, a route passing through the program counter 7, branch target buffer 17, and instruction cache 1 deteriorates the processor speed.

Further, inserting the collapsing buffer 15 between the instruction cache 1 and the instruction decoder 9 slows down the processor speed.

In this way, the instruction supply technique of the prior art deteriorates the operation speed and performance of a processor.

SUMMARY OF THE INVENTION

An object of the present invention is to provide a method of and an apparatus for efficiently supplying instructions to a processor without deteriorating the performance of the processor.

In order to accomplish the object, a preferred embodiment of the present invention provides a method of supplying instructions to a processor, including the steps of reading a plurality of instruction strings each composed of a plurality of instructions, out of instruction memories, selecting one of the read instruction strings, and supplying the selected instruction string to an instruction decoder. The method reads the instruction strings out of the instruction memories before the completion of the prediction, and according to a result of the prediction, selects one of the read instruction strings.

The method may select one of the instruction strings based on a control signal that indicates whether or not a specified instruction is present in the instruction memories.

Another preferred embodiment of the present invention provides a method of supplying instructions to a processor, including the steps of arranging instructions having continuous addresses in a first instruction memory that is divided into blocks, arranging instructions including a branch instruction and having discontinuous addresses in a second instruction memory that is divided into blocks, reading an instruction string from each of the first and second instruction memories, selecting one of the read two instruction strings, and supplying the selected one to an instruction decoder.

The method reads the two instruction strings out of the first and second instruction memories before the completion of the prediction. If it is predicted that the branch instruction is going to be taken, the method selects the instruction string read out of the second instruction memory.

If a specified instruction is present in the second instruction memory, the method selects the instruction string read out of the second instruction memory.

Another preferred embodiment of the present invention provides a method of supplying instructions to a processor, including the steps of arranging instructions having continuous addresses in a first instruction memory that is divided into blocks, transferring strings of instructions from the first instruction memory to a second instruction memory that is divided into blocks, rearranging the instructions in the second instruction memory in order of actual execution without regard to the addresses of the instructions, reading an instruction string from each of the first and second instruction memories, selecting one of the read two instruction strings, and supplying the selected one to an instruction decoder.

If the second instruction memory has an instruction string, the method unconditionally selects data in the second instruction memory and supplies the data to the instruction decoder.

Another preferred embodiment of the present invention provides an apparatus for supplying instructions to a processor, having a program counter for holding the address of an instruction to be executed, a first instruction memory divided into blocks each for storing instructions having continuous addresses, a second instruction memory divided into blocks each for receiving instructions having continuous addresses from the first instruction memory, rearranging the instructions in order of execution, and holding the rearranged instructions, an instruction decoder for decoding instructions read out of one of the first and second instruction memories, a selector for selecting one of instruction strings read out of the first and second instruction memories and supplying the selected one to the instruction decoder, and a branch predictor.

If the branch predictor predicts that a branch instruction to be decoded by the instruction decoder is taken, the selector selects an instruction string read out of the second instruction memory.

In the instruction supply apparatus, the first instruction memory may be an instruction cache that stores instructions having continuous addresses. More precisely, the instruction cache holds, in order of addresses, some of instructions stored in a main memory. The second instruction memory may be a branch target buffer, which receives instructions from the instruction cache and rearranges the instructions according to order of actual execution. More precisely, the instructions in the branch target buffer are rearranged according to order that is effective when a branch instruction is executed. The rearrangement of instructions in the branch target buffer is carried out before the branch predictor completes a prediction whether or not the branch instruction is taken. If the branch predictor predicts that the branch instruction will be taken, the selector selects the instruction string stored in the branch target buffer and supplies it to the instruction decoder. This arrangement never makes instructions following the branch instruction useless, thereby improving instruction supply efficiency.

Another preferred embodiment of the present invention provides an apparatus for supplying instructions to a processor, having a program counter for storing the address of an instruction to be executed, a first instruction memory divided into blocks each for storing instructions having continuous addresses, and a second instruction memory divided into blocks and having a tag array for storing tags assigned to the blocks. Each of the blocks of the second instruction memory receives instructions having continuous addresses from the first instruction memory, rearranges the received instructions in order of execution, and holds the rearranged instructions. The instruction supply apparatus further has an instruction decoder for decoding instructions read out of one of the first and second instruction memories, a selector for selecting an instruction string read out of one of the first and second instruction memories and supplying the selected one to the instruction decoder, and a comparator for comparing the address in the program counter with the tags stored in the tag array. If the address in the program counter agrees with any one of the tags, the selector selects an instruction string read out of the second instruction memory.

In this instruction supply apparatus, the tag array serves as a branch target buffer, and the comparator, which is very small hardware, as a branch predictor. If an address specified by the program counter agrees with any one of the tags stored in the tag array, the selector selects an instruction string read out of the branch target buffer and supplies the selected one to the instruction decoder. This arrangement further reduces the quantity of hardware, thereby reducing the surface area and manufacturing cost of the processor.

This instruction supply apparatus may further have an execution unit for executing an instruction decoded by the instruction decoder, generating a control signal according to a result of the execution of the instruction, and sending the control signal to the second instruction memory. Based on the control signal, the second instruction memory stores an instruction string from the first instruction memory.

BRIEF DESCRIPTION OF THE DRAWINGS

These and other objects, features, aspects, and advantages of the present invention will become more apparent from the following detailed description of the present invention when taken in conjunction with the accompanying drawings, in which:

FIG. 10 is a flowchart showing the operation of the apparatus of FIGS. 9A and 9B;

DETAILED DESCRIPTION OF THE EMBODIMENTS

Preferred embodiments of the present invention will be explained with reference to the drawings.

First Embodiment

Figure 1A:
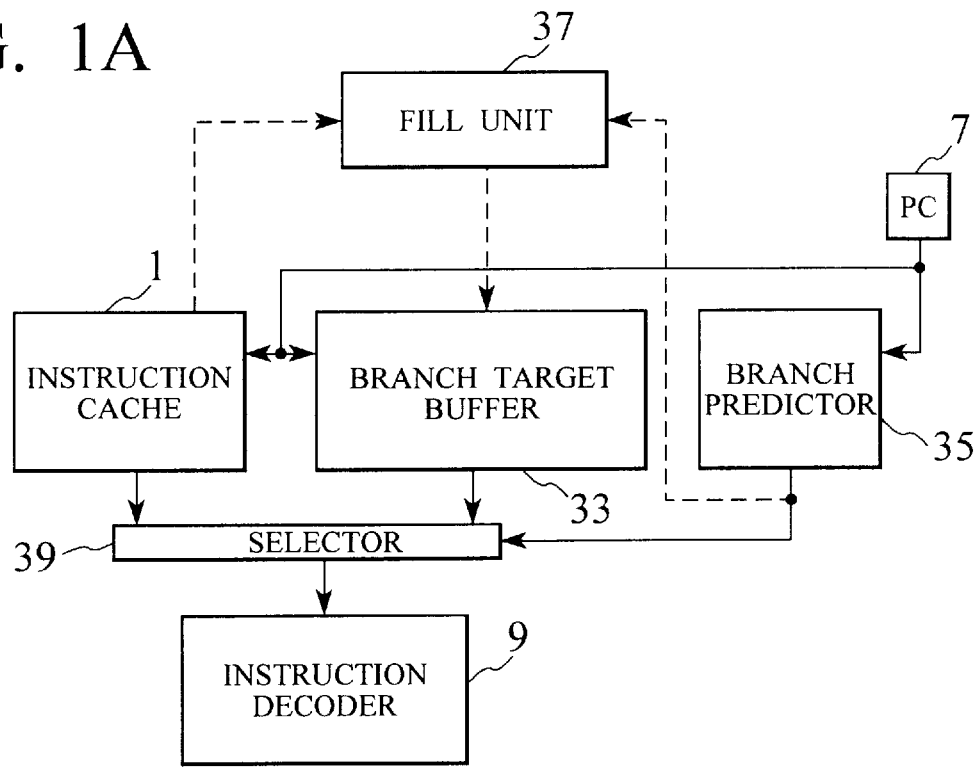
FIGS. 1A and 1B show an apparatus for supplying instructions to a processor, according to a first embodiment of the present invention.
Figure 1B:
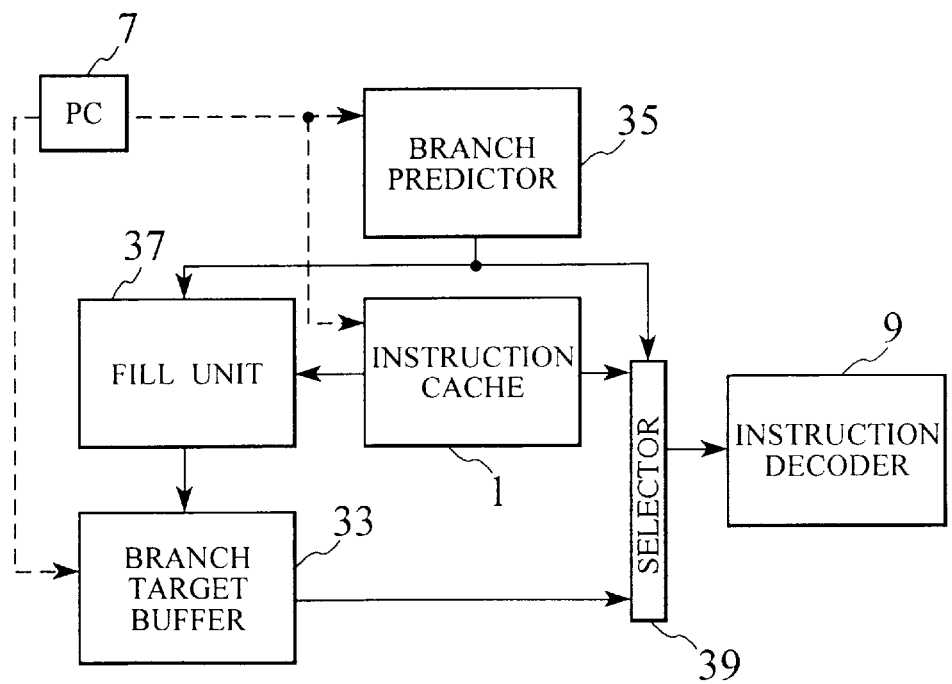

FIGS. 1A and 1B show an apparatus for supplying instructions to a processor, according to the first embodiment of the present invention. Dotted lines in FIG. 1A indicate connections between a fill unit 37 and a branch predictor 35, a branch target buffer 33, and an instruction cache 1.

FIG. 1B shows relationships between the fill unit 37 and the branch predictor 35, branch target buffer 33, and instruction cache 1. The same parts as those of the prior art are represented with the same reference marks and are not explained again.

Figure 14:
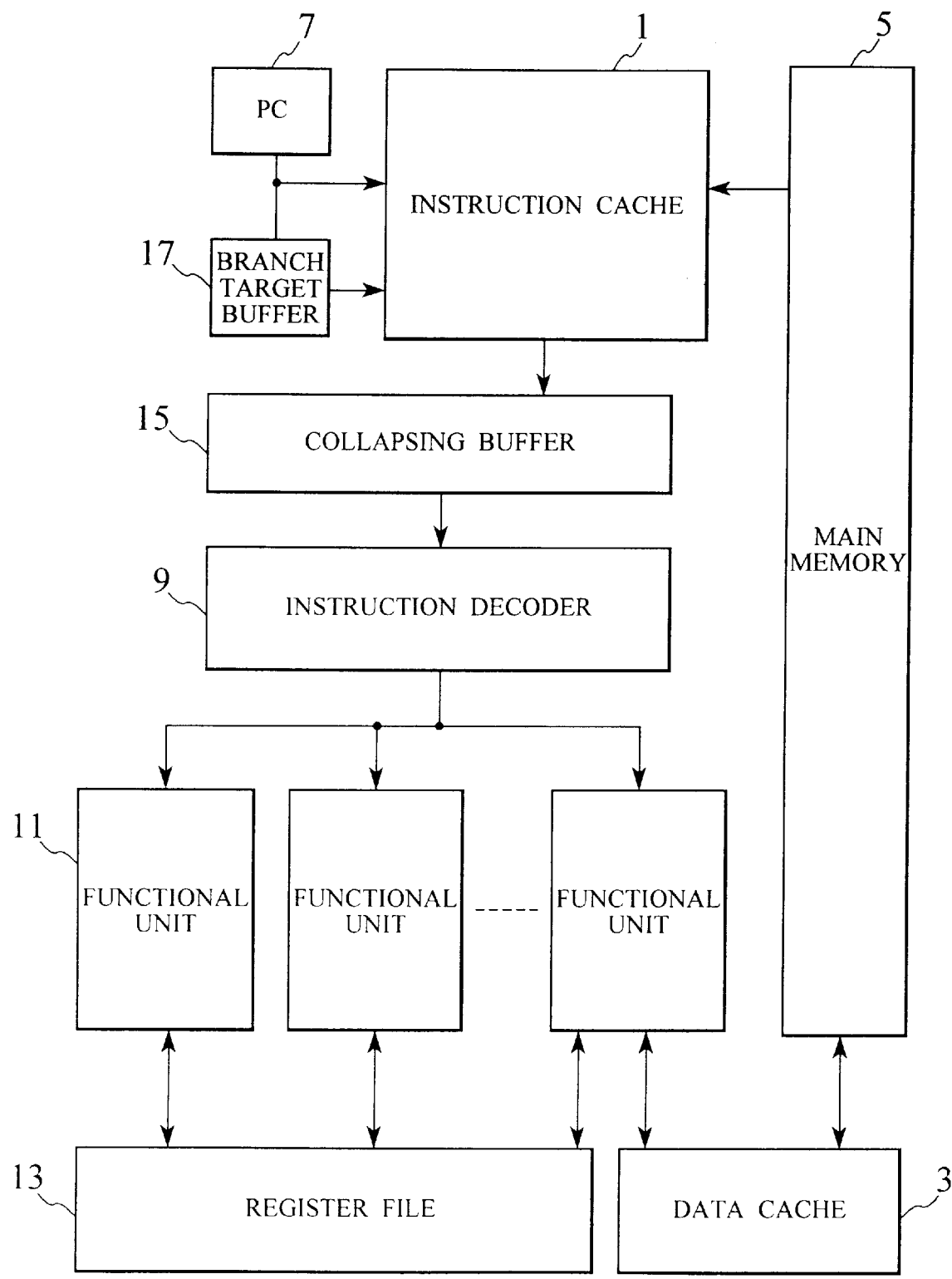
FIG. 14 is a block diagram showing a processor having a collapsing buffer according to a prior art.

The apparatus of the first embodiment has the instruction cache 1, the branch target buffer 33, which is an improvement of the branch target buffer 17 of the prior art of FIG. 14, the branch predictor 35, a selector 39, an instruction decoder 9, and a program counter 7.

The instruction cache 1 stores copies of some of instructions stored in a main memory (not shown), so that a CPU may access the instruction cache 1 instead of the main memory, to improve an operation speed.

Similar to the instruction cache 1, the branch target buffer 33 consists of a plurality of lines each storing a string of instructions that belong to basic blocks in the instruction cache 1.

The branch predictor 35 only predicts whether or not a branch instruction is taken. The branch predictor 35 accumulates the statuses of preceding operation results. For example, it stores a history of preceding branch results each with 1 or 0 and refers to the history to predict whether or not a given branch instruction is executed. The branch predictor 35 does not predict a branch target address.

The selector 39 receives instruction strings from the instruction cache 1 and branch target buffer 33, selects one of them according to a prediction provided by the branch predictor 35, and sends the selected one to the instruction decoder 9.

Figure 2:
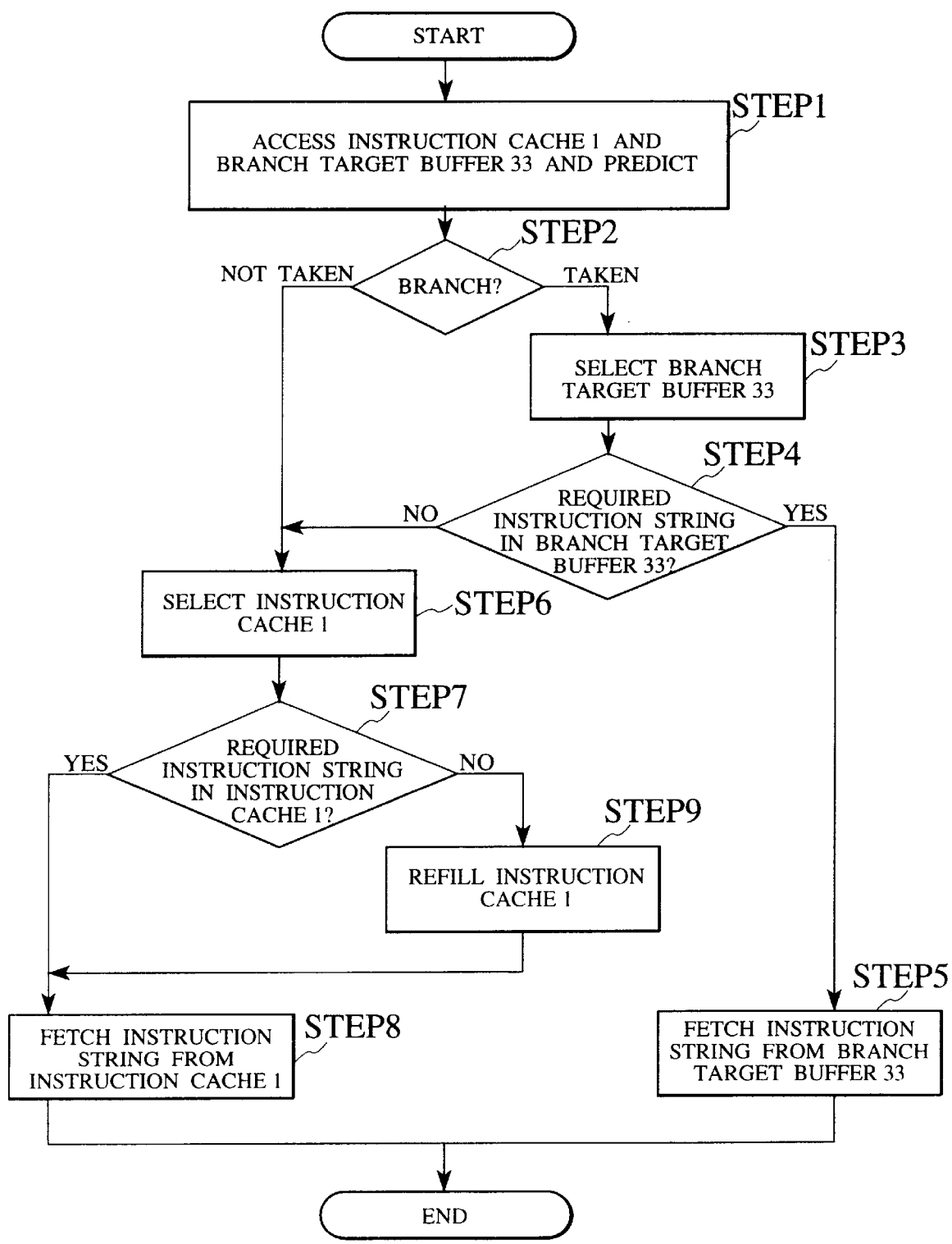
FIG. 2 is a flowchart showing the operation of the apparatus of FIGS. 1A and 1B.

The operation of the first embodiment will be explained with reference to a flowchart of FIG. 2.

In step 1, an address in the program counter 7 is used to access the instruction cache 1 and branch target buffer 33. The branch predictor 35 predicts whether or not a branch is caused by a branch instruction.

If step 2 predicts that a branch occurs, the selector 39 selects, in step 3, the branch target buffer 33 according to a select signal from the branch predictor 35. An instruction storing operation of the branch target buffer 33 will be explained later.

If step 4 determines that the branch target buffer 33 has a required instruction string, step 5 transfers the required instruction string from the branch target buffer 33 to the instruction decoder 9 through the selector 39.

If the step 2 predicts that there will be no branch, or if the step 4 determines that there is no required instruction string in the branch target buffer 33, the selector 39 selects, in step 6, the instruction cache 1.

If step 7 determines that the instruction cache 1 has the required instruction string, step 8 transfers the required instruction string from the instruction cache 1 to the instruction decoder 9 through the selector 39. If the step 7 determines that there is no required instruction string in the instruction cache 1, step 9 transfers instructions for one line from a memory system such as a main memory 5 of FIG. 6 to the corresponding line of the instruction cache 1. Thereafter, the step 8 transfers the required instruction string from the instruction cache 1 to the instruction decoder 9 through the selector 39.

To store an instruction string in the branch target buffer 33, the fill unit 37 is used as shown in FIG. 1B.

The operation of the fill unit 37 will be explained with reference to FIGS. 3A to 3C. The fill unit 37 has an instruction buffer 41, which receives instruction strings from the instruction cache 1, rearranges and combines them, and sends a combined instruction string to the branch target buffer 33.

Figure 3A:
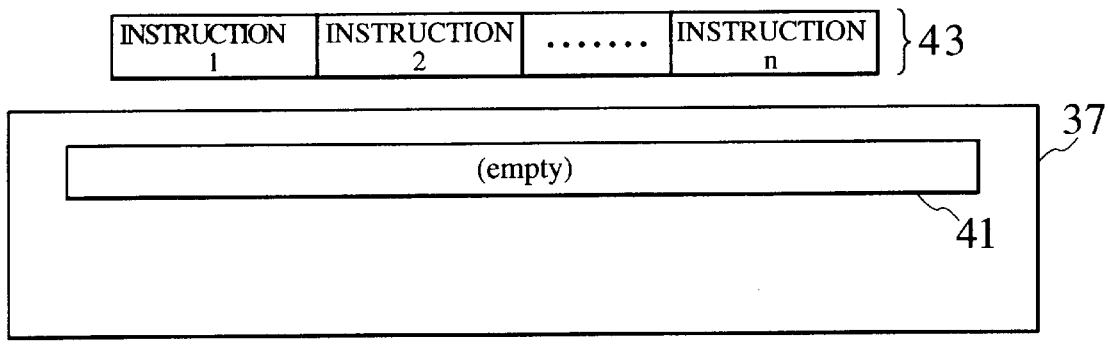
FIGS. 3A to 3C show the operation of a fill unit 37 of FIGS. 1A and 1B.

In FIG. 3A, the fill unit 37 receives an instruction string 43 from the instruction cache 1.

Figure 3B:
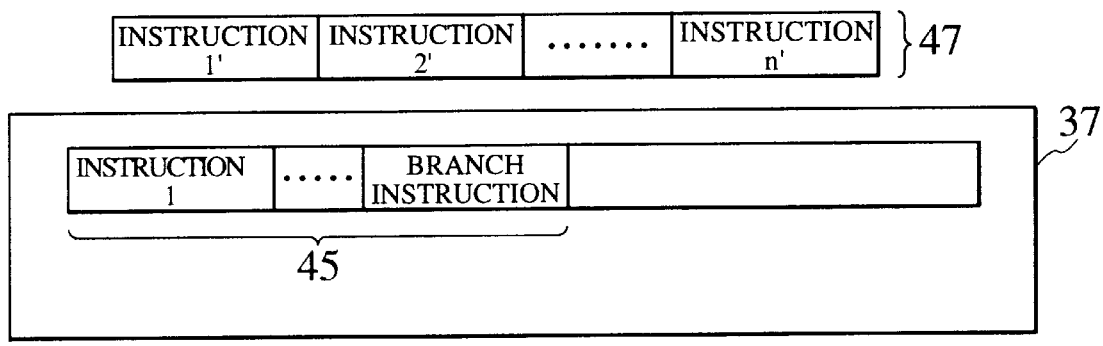

In FIG. 3B, the fill unit 37 decodes the instruction string 43. A portion of the instruction string 43 starting from the first instruction or from an instruction specified by an address in the program counter 7 up to a branch instruction that defines the boundary of a basic block is stored as an instruction string 45 in the instruction buffer 41. If the instruction string 43 contains no instruction that forms the boundary of a basic block, the instruction string 43 is not stored in the instruction buffer 41. Even if the instruction string 43 contains the boundary of a basic block, the instruction string 43 will not be stored in the instruction buffer 41 if it is predicted that no branch occurs in the instruction string 43. After the instruction buffer 41 stores the instruction string 45, the fill unit 37 receives the next instruction string 47 from the instruction cache 1.

Figure 3C:
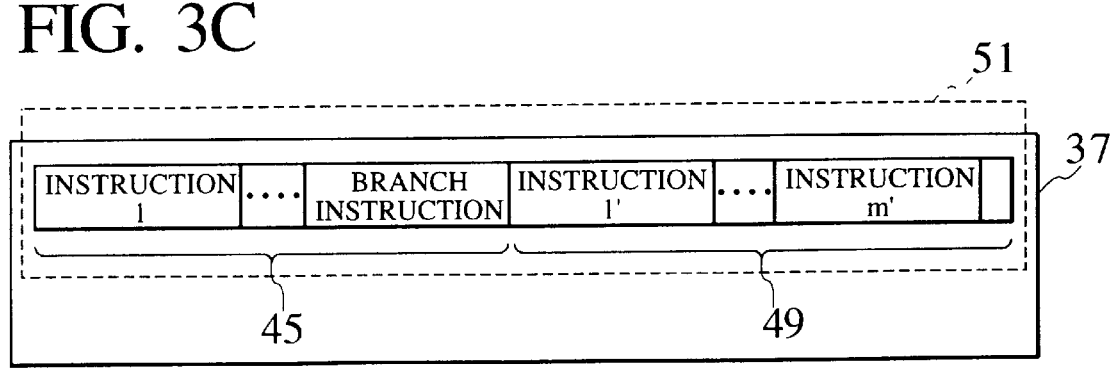

In FIG. 3C, the fill unit 37 decodes the instruction string 47 and stores a portion of the instruction string 47 from the start to the boundary of a basic block as an instruction string 49 in the instruction buffer 41. If the instruction string 47 has no instruction that defines the boundary of a basic block, a portion of the instruction string 47 up to the capacity of the instruction buffer 41 is stored as the instruction string 49 in the instruction buffer 41. If the instruction string 47 contains an instruction that defines the boundary of a basic block and if the portion up to the boundary exceeds the capacity of the instruction buffer 41, a portion of the instruction string 47 up to the capacity of the instruction buffer 41 is stored as the instruction string 49 in the instruction buffer 41. The instruction string 49 is combined with the instruction string 45, to form an instruction string 51.

In this way, the instruction strings 43 and 47 are rearranged and combined to form the instruction string 51, which is stored in the branch target buffer 33.

Figure 4:
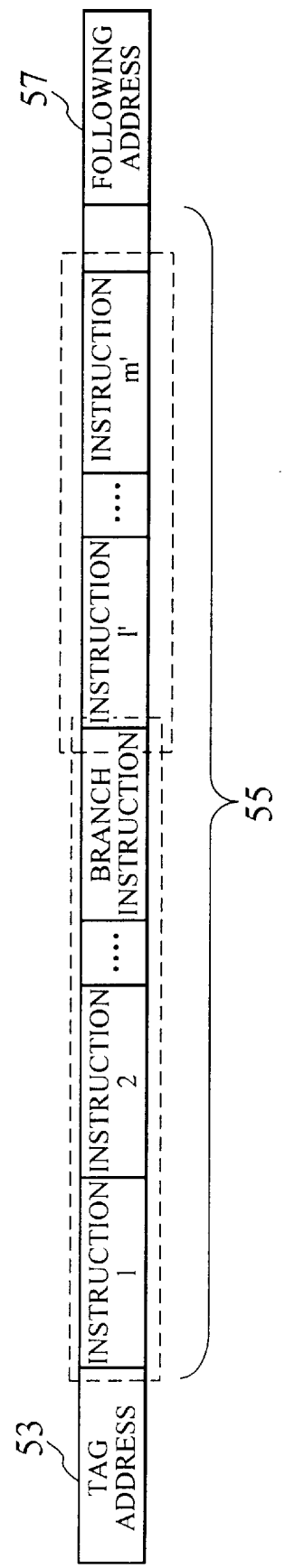
FIG. 4 shows an example of an entry format of a branch target buffer 33 of FIGS. 1A and 1B.

FIG. 4 shows the format of an entry in the branch target buffer 33 that stores the instruction string 51. The format consists of a tag address field 53 indicating a first instruction address, an instruction field containing the instruction strings 45 and 49 of FIG. 3, and a following address field 57 for storing an instruction address that follows the instruction string 49.

Figure 5:
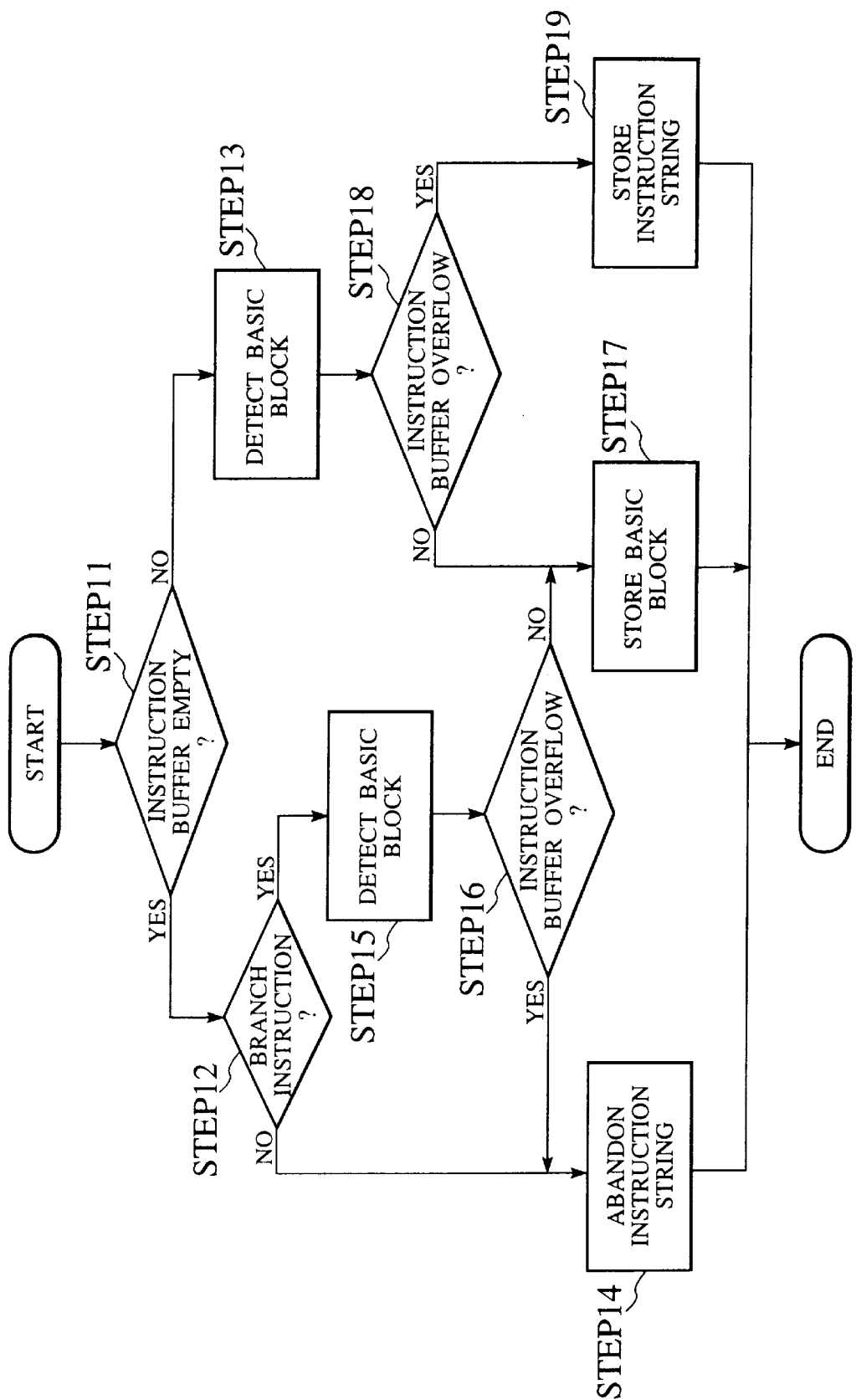
FIG. 5 is a flowchart showing the operation of the fill unit 37.

The operation of the fill unit 37 will be explained with reference to a flowchart of FIG. 5.

When the fill unit 37 receives an instruction string from the instruction cache 1, step 11 checks to see if the instruction buffer 41 in the fill unit 37 already has an instruction string.

If there is no instruction string in the instruction buffer 41, step 12 checks to see if the received instruction string contains a branch instruction that forms the boundary of a basic block.

If there is no branch instruction, step 14 abandons the received instruction string. Namely, the received instruction string is not stored in the instruction buffer 41.

If the step 12 determines that the received instruction string contains a branch instruction, step 15 detects in the received instruction string an instruction string portion up to the boundary of a basic block. Step 16 checks to see if the detected instruction string portion exceeds the capacity of the instruction buffer 41. If it exceeds the capacity, the step 14 abandons the received instruction string, and if not, step 17 stores the detected instruction string portion in the instruction buffer 41.

If the step 11 determines that the instruction buffer 41 already has an instruction string, step 13 detects in the received instruction string an instruction string portion up to the boundary of a basic block. Step 18 checks to see if the detected instruction string portion exceeds the capacity of the instruction buffer 41. If it does not exceed the capacity, the step 17 stores the detected instruction string portion in the instruction buffer 41, and if it exceeds the capacity, step 19 stores a part of the detected instruction string portion meeting the capacity of the instruction buffer 41 in the instruction buffer 41.

An instruction string that is present in the instruction buffer 41 after the step 17 or 19 is abandoned if the branch predictor 35 predicts that a branch instruction related to the instruction string will not be taken.

Figure 6:
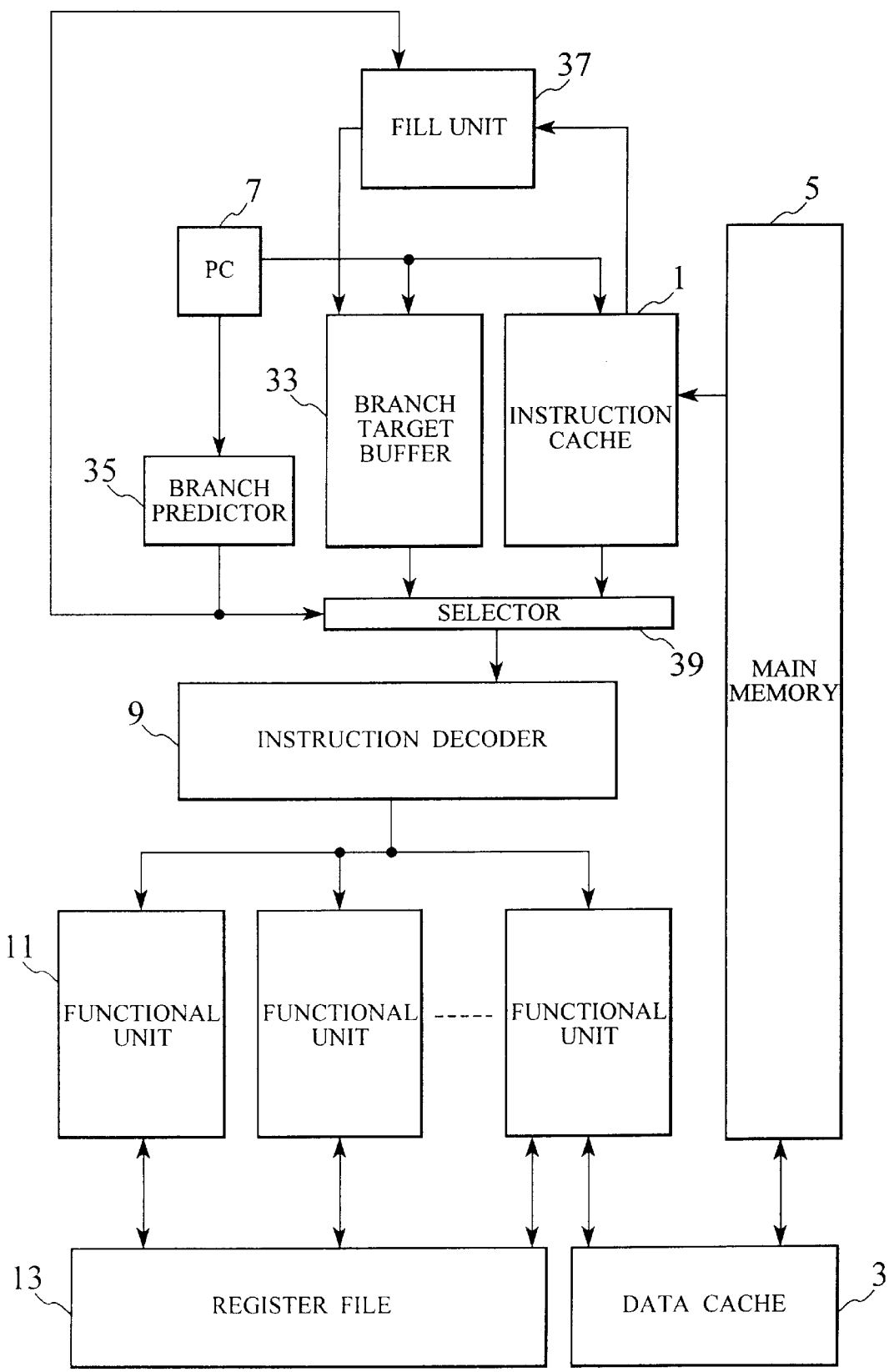
FIG. 6 is a block diagram showing a processor having the instruction supply apparatus of FIGS. 1A and 1B.

FIG. 6 is a block diagram showing a processor incorporating the instruction supply apparatus of the first embodiment. The processor has functional units (execution units) 11, a main memory 5, and a register file 13. The other elements of the processor are the same as those of FIGS. 1A and 1B and are represented with the same reference marks.

As explained above, the branch target buffer 33 stores a basic block serving as a branch source and a basic block serving as a branch target and sequentially provides them to the selector 39. Before the branch predictor 35 completes a prediction whether or not a branch occurs, the branch target buffer 33 stores an instruction string that is executed if a branch occurs. If the branch predictor 35 predicts that a branch occurs, the instruction string stored in the branch target buffer 33 is supplied to an instruction decoder 9 through the selector 39. If the branch predictor 35 predicts that no branch will occur, an instruction string stored in the instruction cache 1 is supplied to the instruction decoder 9 through the selector 39.

The processor of the prior art of FIG. 14 includes the operation-speed-slowing route that passes through the program counter 7, branch target buffer 17, and instruction cache 1. On the other hand, the processor of the present invention of FIG. 6 includes no such a route. Accordingly, the processor of the present invention is capable of operating at a higher speed than the conventional processor.

Figure 15:
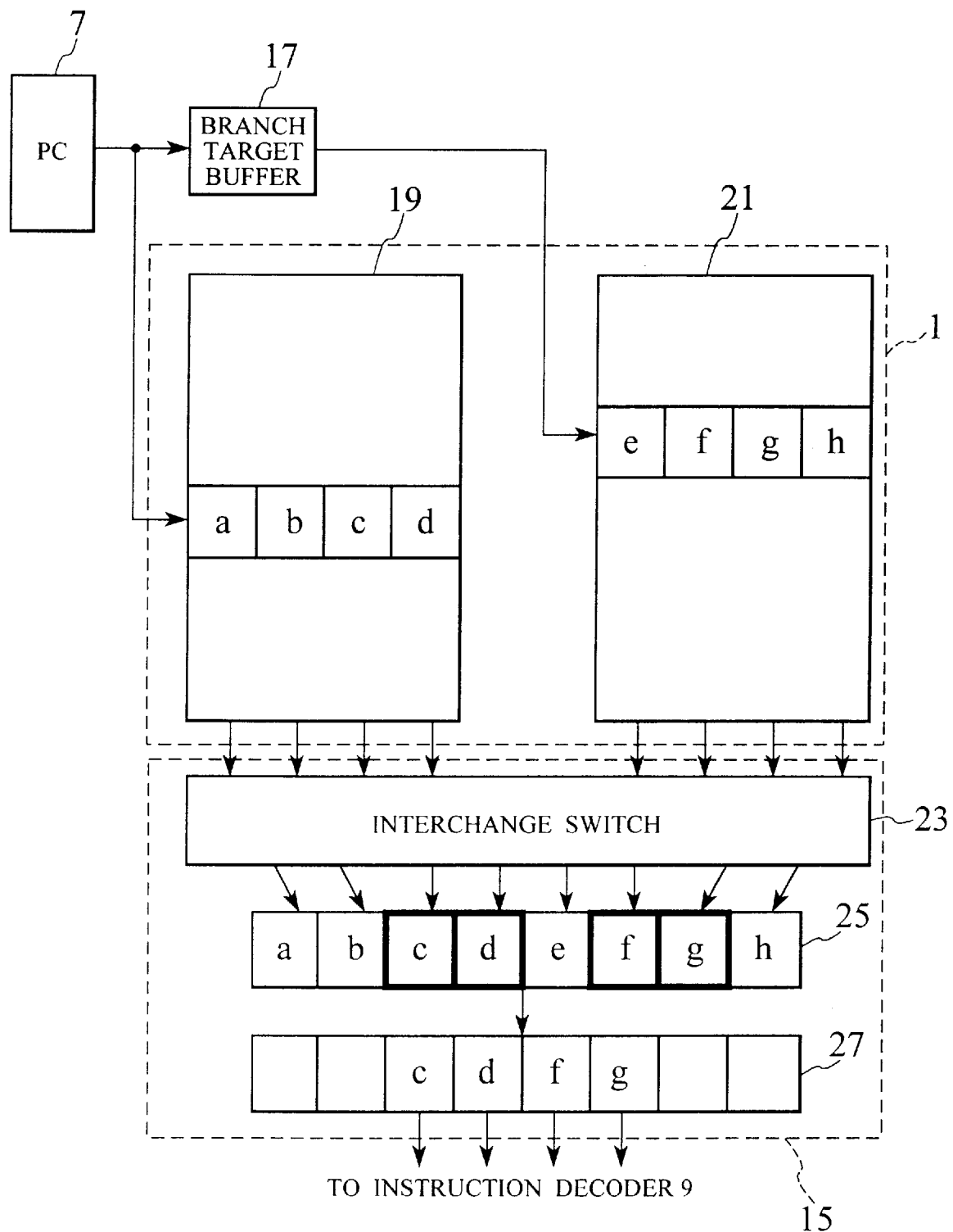
FIG. 15 shows the collapsing buffer 15 of FIG. 14 and the periphery thereof.
Figure 16:
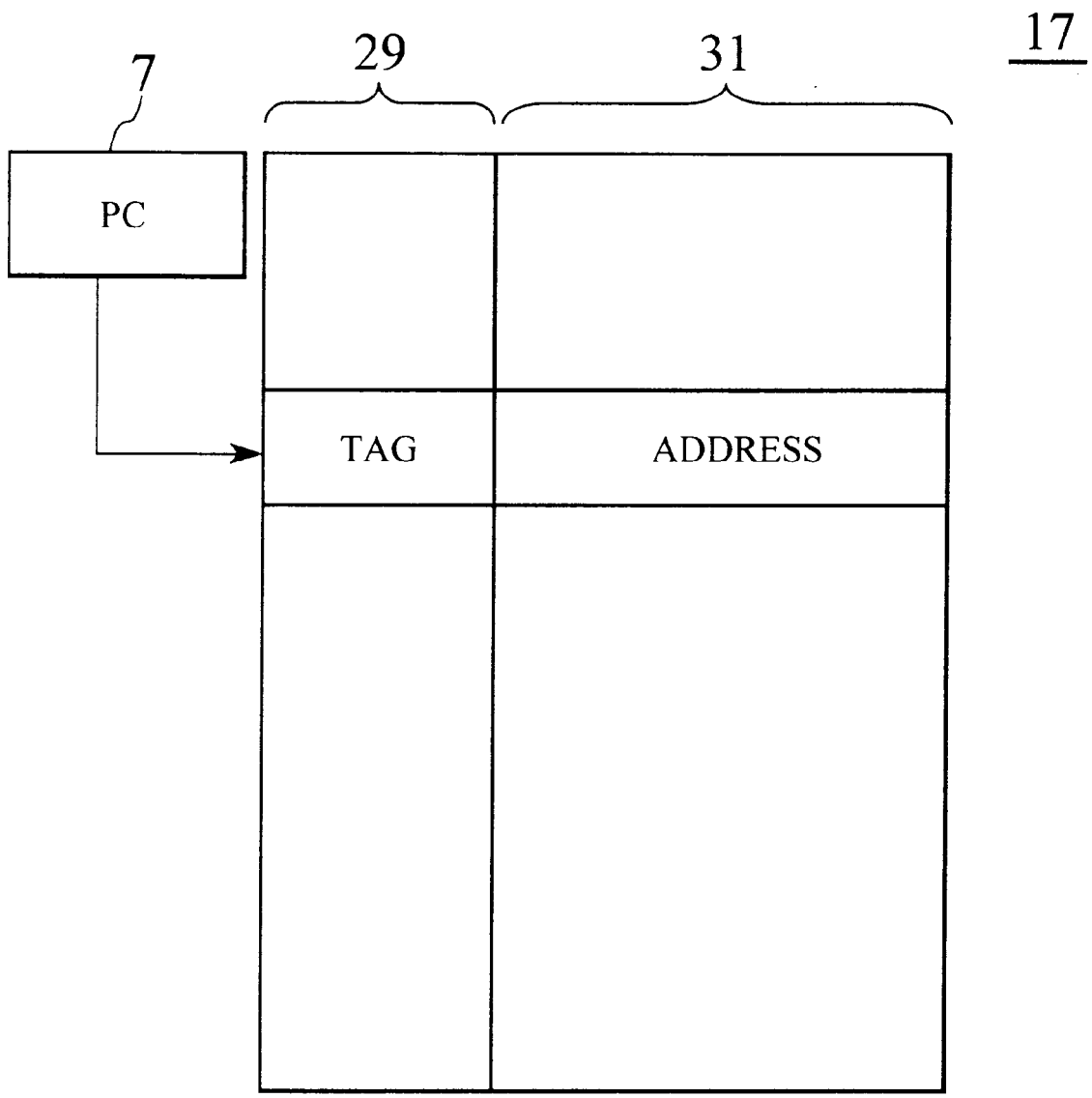
FIG. 16 shows the structure of a branch target buffer 17 of FIG. 14.

The selector 39 between the instruction cache 1 and the instruction decoder 9 is a very simple circuit, which never affects the operation speed of the processor, unlike the collapsing buffer 15 of the prior art of FIGS. 14 and 15.

To evaluate the performance of the processor of the first embodiment, simulations were made.

The simulations were carried out with a cycle-level pipeline simulator on a superscalar processor of out-of-order execution. The details of this processor is shown in Table 1. "Gshare method" in the table is described by S. McFarling in "Combining Branch Predictors," Technical Note TN-36, DEC-WRL, June 1993.

TABLE 1

| | |
|---|---|
| Instruction supply width | 8 instructions |
| Branch prediction | 512-set 2-way set-associative BTB, gshare method, 12-bit branch history register, 4096-entry pattern history table, 3-cycle prediction miss penalty |
| Instruction issuance width | 8 instructions |
| Functional units | 5 integer ALUs, Integer MUL/DIV, 2 load store units, 2 floating-point ALUs, 2 floating-point MULs, 2 floating-point DIV/SQRTs |
| Register file | 32 32-bit integer registers, 32 32-bit floating-point registers |

TABLE 1-continued

| | |
|---|---|
| Instruction cache | 64-kilobyte 4-way set-associative, 32-byte line size, 2 ports, 6-cycle miss penalty |
| Data cache | 64-kilobyte 4-way set-associative, 32-byte line size, 2 ports, write back method, non-blocking, 6-cycle miss penalty |
| L2 cache | No cache miss |

The latency and issuing intervals of each instruction executed are shown in Table 2.

TABLE 2

| | Latency/instruction issuance intervals |
|---|---|
| Integer ALU | 1/1 |
| Integer MUL | 3/1 |
| Integer DIV | 35/35 |
| Load store | 2/1 |
| Floating-point ADD | 2/1 |
| Floating-point MUL | 3/1 |
| Floating-point DIV | 6/6 |
| Floating-point AQRT | 6/6 |

The performance of the processor was simulated with and without the branch target buffer 33.

The branch target buffer 33 in the simulations was of 512-set 2-way set-associative and had a line size of 32 bytes. This hardware is equivalent to a 32-kilobyte cache.

Simulations were carried out with SPEC92 benchmark programs listed in Table 3.

Data given to the programs were reference data prepared with SPEC. To shorten execution time, the data were partly changed. These changes are listed in Table 3. The table also shows the number of instructions executed.

C programs were compiled with a GNU GCC compiler of version 2.6.3.

FORTRAN programs were converted into C programs with an AT&T F2C program of version 1994.11.03 and were compiled with the GCC compiler.

TABLE 3

| Program | Input data | Change | Number of instructions to execute (million) |
|---|---|---|---|
| 0.80.espresso | bca.in | | 450.2 |
| 0.22.li | li-input.lsp | short input | 1000.0 |
| 0.23.eqntott | int pri 3.eqn | | 1000.0 |
| 0.26.compress | in | | 664.4 |
| 0.72.sc | loada3 | | 363.4 |
| 0.85.gcc | cexp.1 | | 19.9 |
| 0.13.spice2g6 | greycode.in | short input | 1000.0 |
| 0.15.doduc | doducin | | 1000.0 |
| 0.34.mdljdp2 | mdlj2.dat | MAX STEPS=250 | 1000.0 |
| 0.39.wave5 | | | 1000.0 |
| 0.47.tomcatv | | N=129 | 480.8 |
| 0.48.ora | params | ITER=15200 | 116.8 |
| 0.52.alvinn | | NUM EPOCHS=50 | 1000.0 |
| 0.56.ear | args.short | | 420.5 |
| 0.77.mdljsp2 | mdlj2.dat | MAX STEPS=250 | 1000.0 |
| 0.78.swm256 | swm256.in | ITMAX=120 | 1000.0 |
| 0.89.su2cor | su2cor.in | short input | 766.2 |
| 0.90.hydro2d | hydro2d.in | short input | 11.2 |
| 0.93.nasa7 | | | 1000.0 |
| 0.94.hpppp | natoms | short input | 1000.0 |

Figure 7:
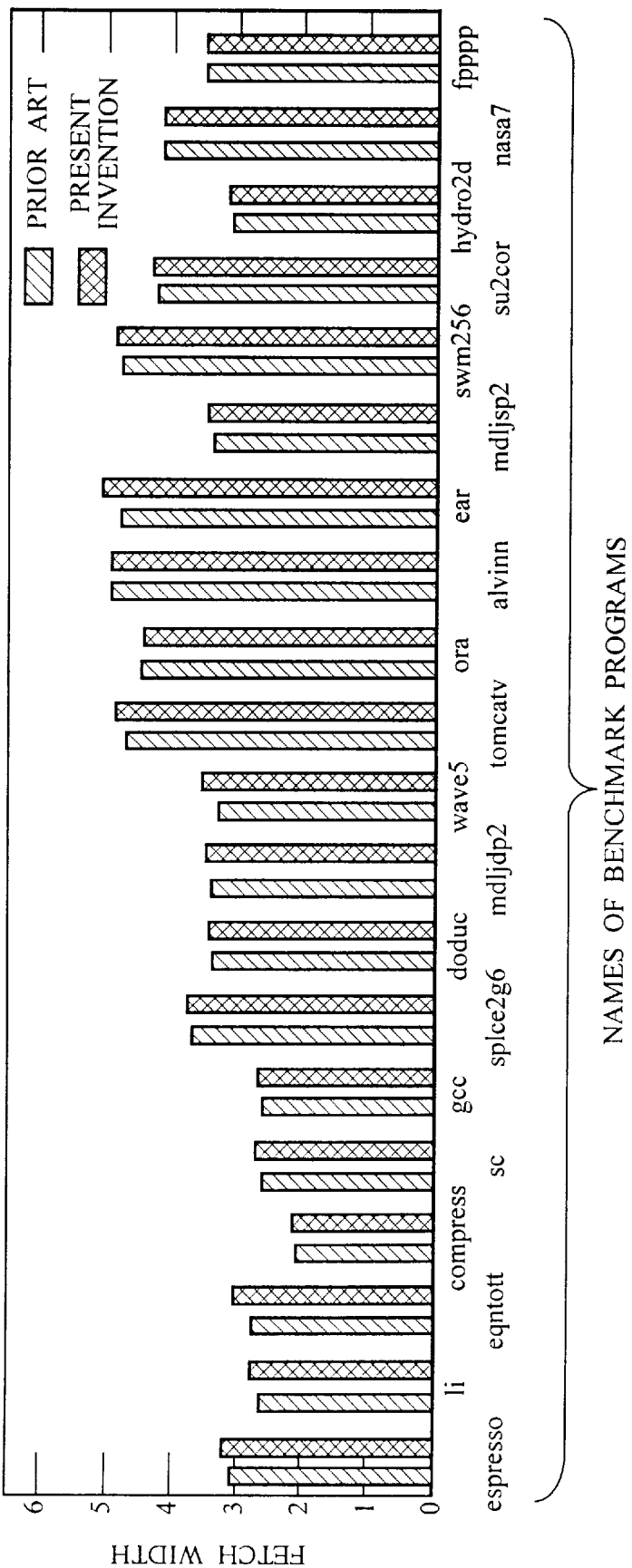
FIG. 7 shows simulation results of the processor of FIG. 6 and of a prior art.
Figure 8:
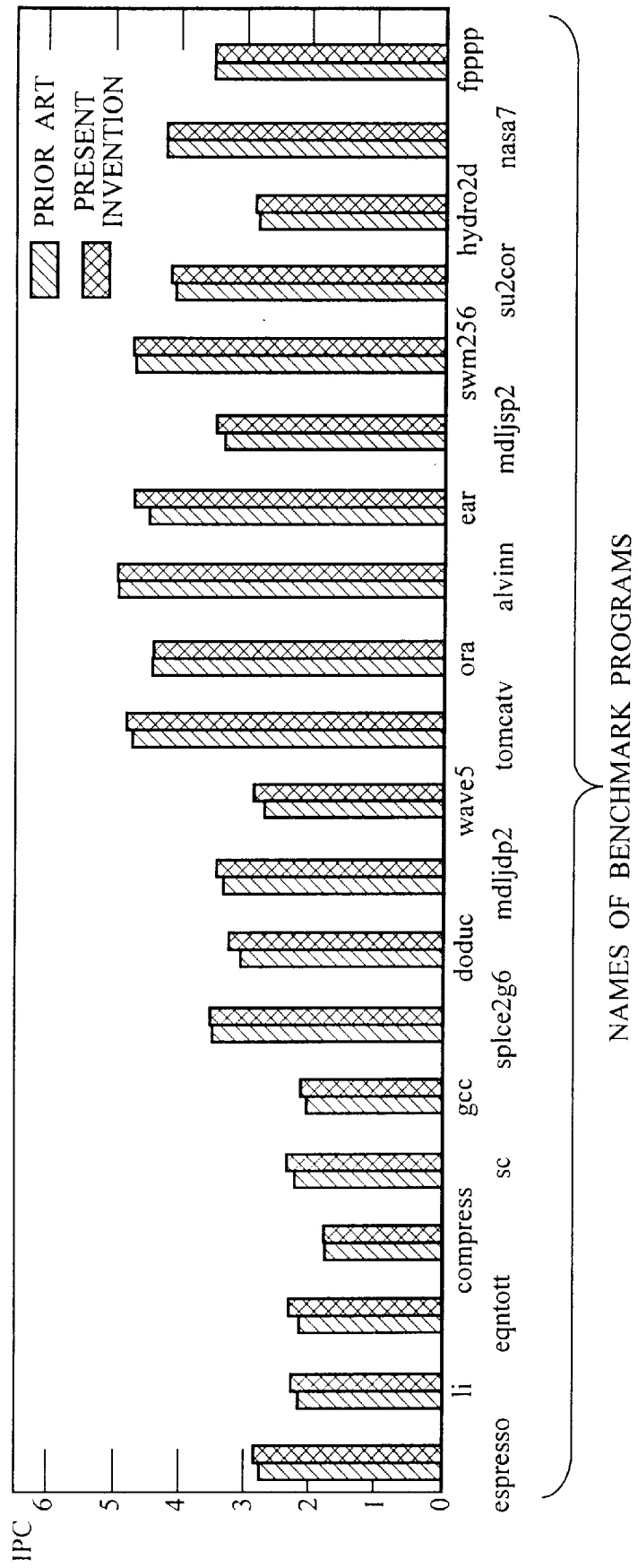
FIG. 8 shows other simulation results of the processor of FIG. 6 and of the prior art.

FIGS. 7 and 8 show results of the simulations carried out on the SPEC92 benchmark programs with the processors of the present invention and prior art.

FIG. 7 shows instruction supply efficiency results and FIG. 8 shows processor performance results.

The processor of the present invention shows an improvement of 4.8% on average and 9.4% at maximum in instruction supply efficiency on integer processing programs. As a result, the present invention shows an improvement of 2.1% on average and 6.2% at maximum in processor performance.

On floating-point processing programs, the present invention shows an improvement of 2.0% on average and 7.8% at maximum in instruction supply efficiency. As a result, the present invention shows an improvement of 2.1% on average and 6.2% at maximum in processor performance.

As is apparent in the simulation results, the apparatus for supplying instructions to a processor of the first embodiment is capable of improving instruction supply efficiency as well as the performance of the processor.

Second Embodiment

Figure 9A:
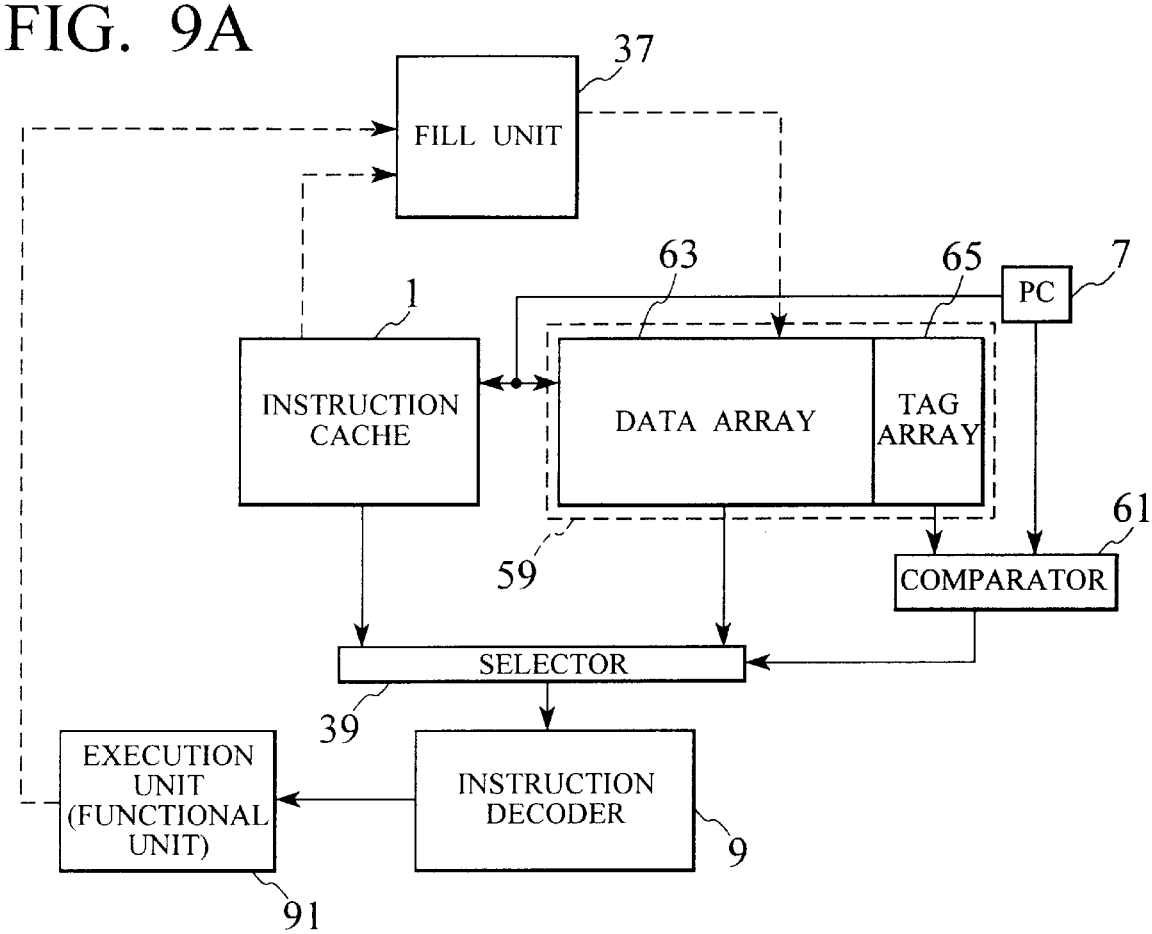
FIGS. 9A and 9B show an apparatus for supplying instructions to a processor, according to a second embodiment of the present invention.

FIG. 9A is a block diagram showing an apparatus for supplying instructions to a processor, according to the second embodiment of the present invention. Dotted lines indicate connections between a fill unit 37 and an execution unit 91, a branch target buffer 59, and an instruction cache 1 in the instruction supply apparatus.

Figure 9B:
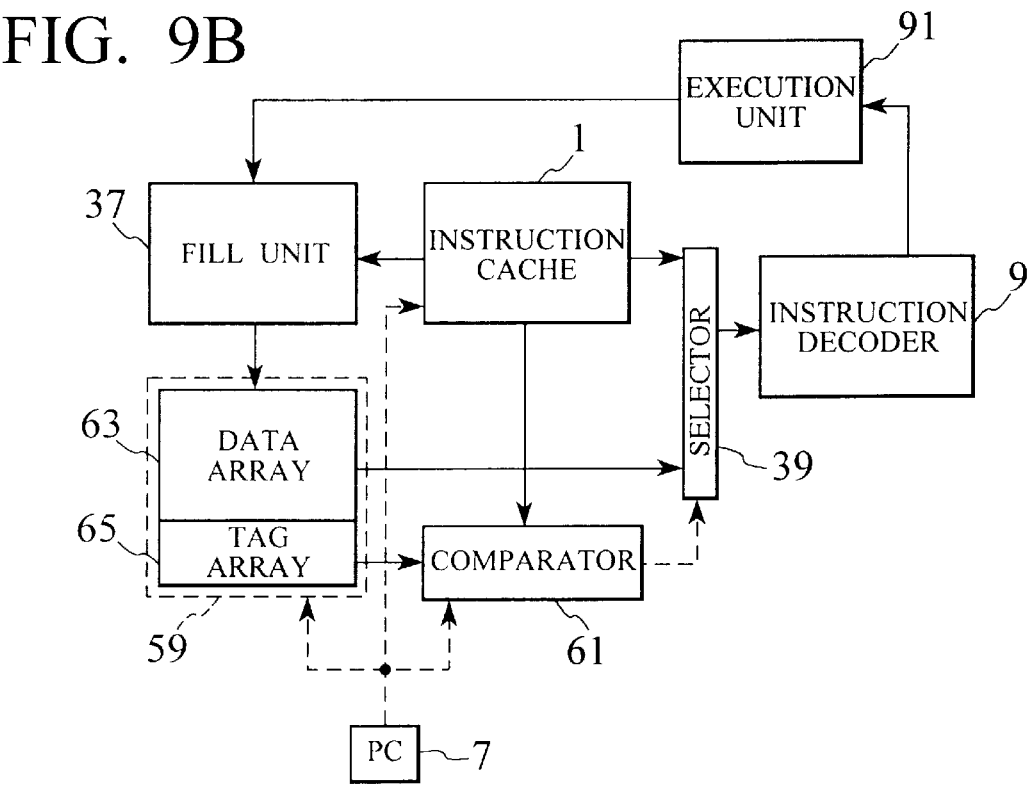

FIG. 9B shows relationships between the fill unit 37 and the execution unit 91, branch target buffer 59, instruction cache 1, etc., in the instruction supply apparatus. The same parts as those of the prior art and first embodiment are represented with the same reference marks and are not explained again.

The apparatus of the second embodiment consists of the instruction cache 1, the branch target buffer 59, a comparator 61, a selector 39, an instruction decoder 9, a program counter 7, the execution unit 91, etc. The branch target buffer 59 consists of a data array 63 and a tag array 65.

The branch target buffer 59 is a replacement of the branch target buffer 33 of the first embodiment, and the comparator 61 is a replacement of the branch predictor 35 of the first embodiment.

The data array 63 of the branch target buffer 59 has lines each storing a string of instructions that belong to different base blocks in the instruction cache 1. The data stored in the data array 63 are similar to the data stored in the branch target buffer 33 of the first embodiment.

The tag array 65 stores tags assigned to the lines in the data array 63. The comparator 61 compares an address in the program counter 7 with the tags in the tag array 65. If any one of the tags agrees with the address in the program counter 7, the comparator 61 generates a control signal for the selector 39 so that the selector 39 may select data in the data array 63.

The operation of the second embodiment will be explained with reference to a flowchart of FIG. 10.

Step 101 accesses the instruction cache 1 and branch target buffer 59 according to an address in the program counter 7.

In step 102, the comparator 61 compares the address in the program counter 7 with each of the tags stored in the tag array 65.

If the address agrees with any one of the tags, i.e., if the branch target buffer 59 has a required instruction string, the comparator 61 generates, in step 103, a control signal for the selector 39 so that the selector 39 may select the required instruction string stored in the data array 63 of the branch target buffer 59. An instruction storing operation of the branch target buffer 59 will be explained later.

If the address in the program counter 7 agrees with none of the tags in step 102, i.e., if the required instruction string is not in the branch target buffer 59, step 104 selects the instruction cache 1.

If the instruction cache 1 has the required instruction string in step 105, step 106 fetches the instruction string from the instruction cache 1.

Figure 12:
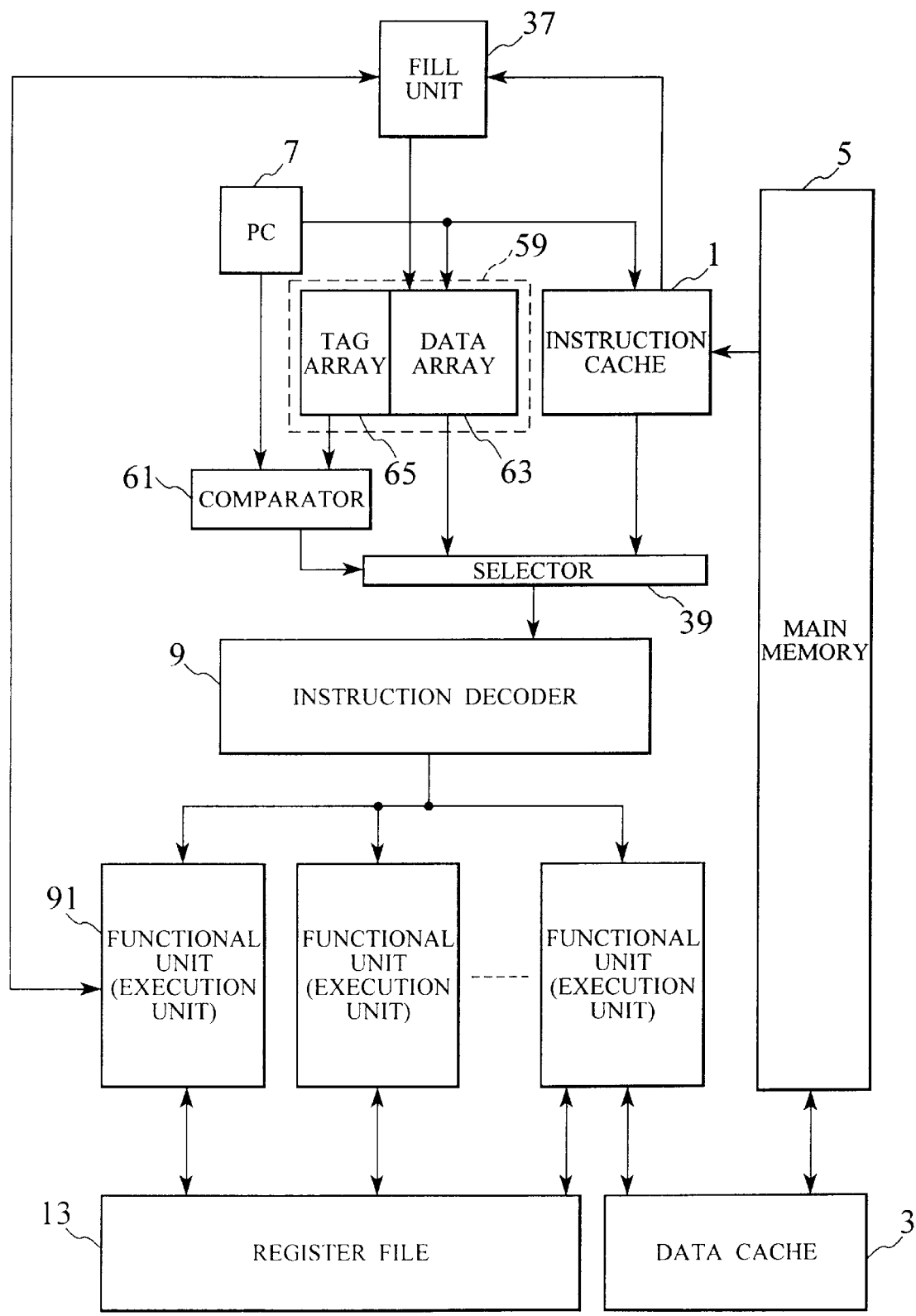
FIG. 12 is a block diagram showing a processor having the instruction supply apparatus of FIGS. 9A and 9B.
Figure 13:
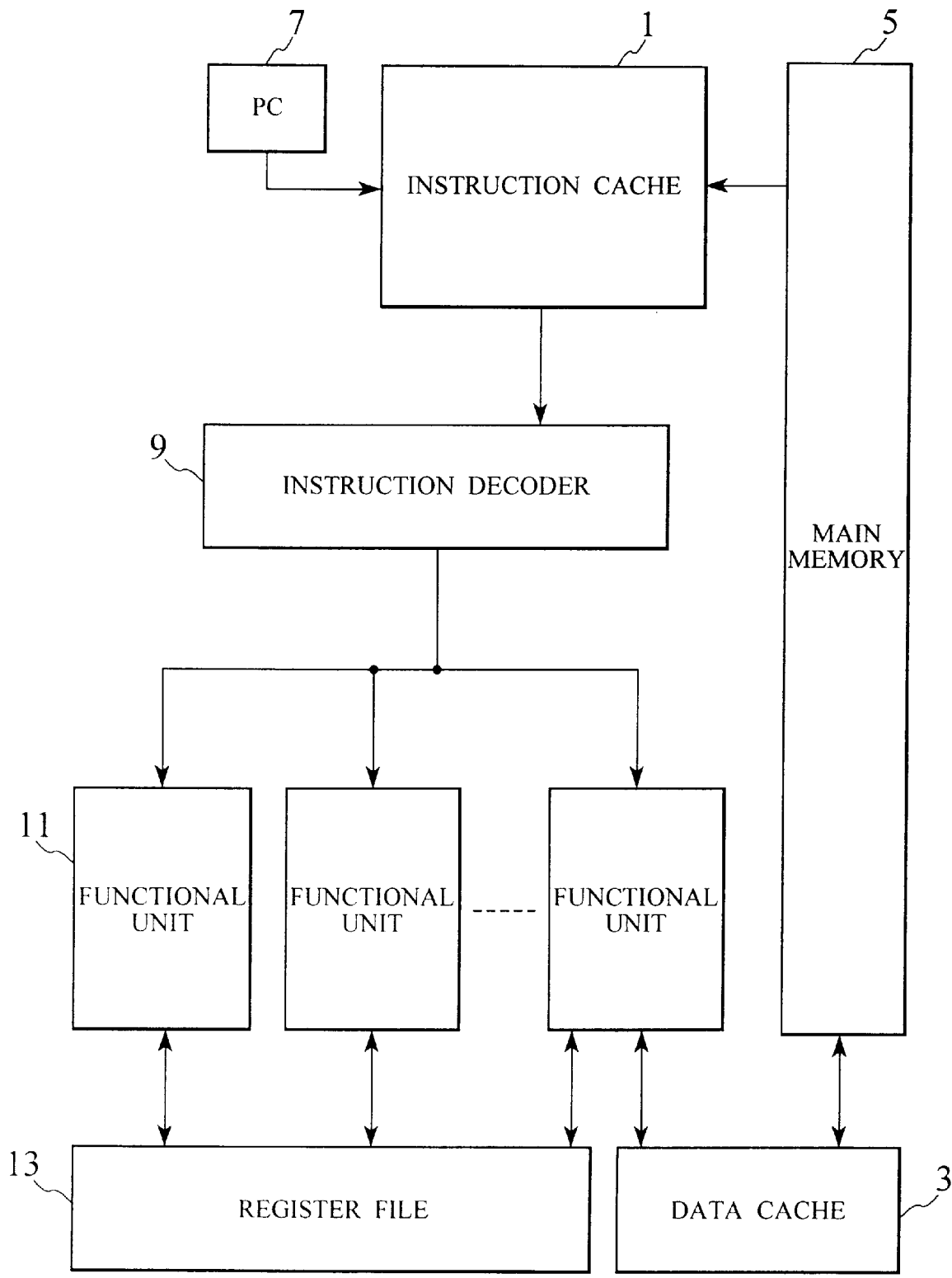
FIG. 13 is a block diagram showing a RISC processor according to a prior art.

If the instruction cache 1 does not have the required instruction string in step 105, step 107 transfers the instruction string from a line of a memory system such as a main memory 5 of FIG. 12 to a line of the instruction cache 1. Thereafter, the step 106 fetches the required instruction string from the instruction cache 1.

Figure 11:
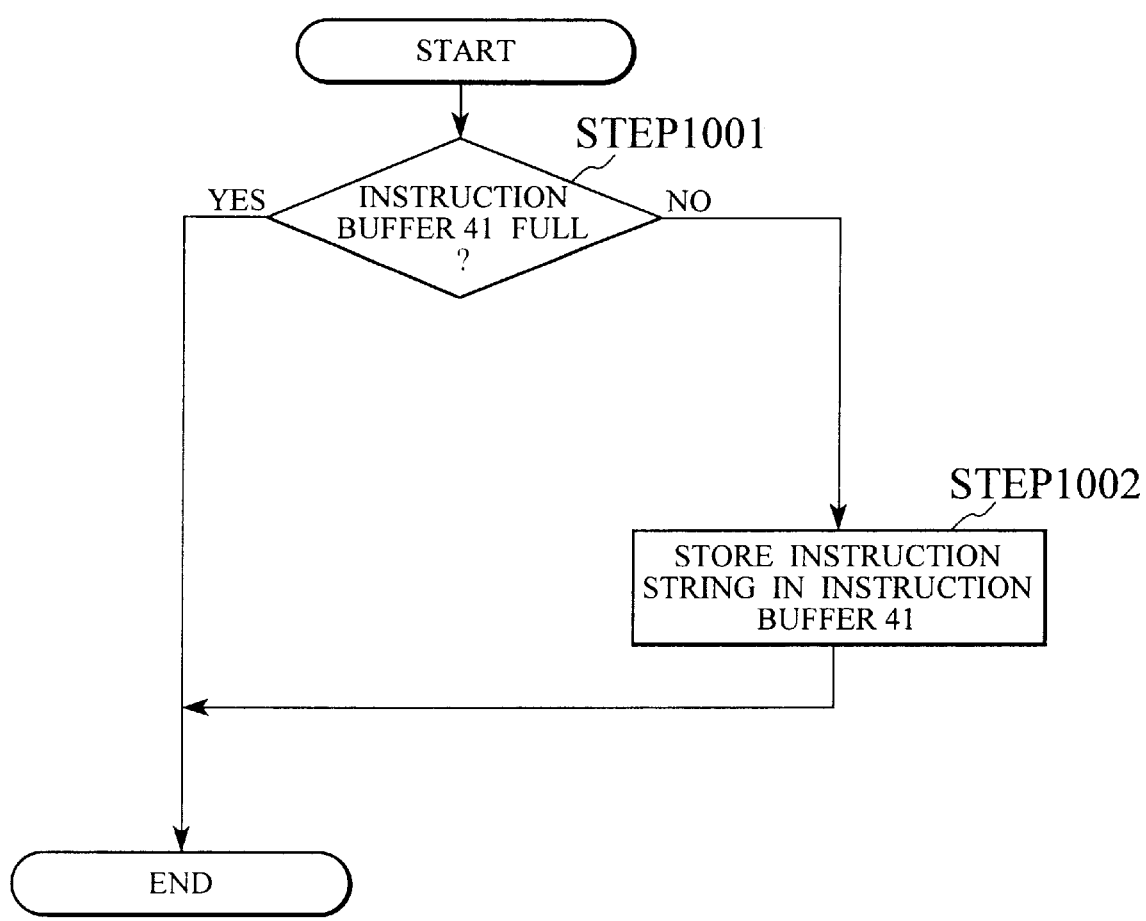
FIG. 11 is a flowchart showing an operation of storing an instruction string into a branch target buffer 59 of FIGS. 9A and 9B.

The operation of storing an instruction string in the branch target buffer 59 will be explained with reference to a flowchart of FIG. 11. Similar to the first embodiment, the fill unit 37 is used for this operation.

The fill unit 37 receives an instruction string from the instruction cache 1. Step 1001 checks to see if an instruction buffer 41 of the fill unit 37 is full. If it is not full, step 1002 stores the instruction string in the instruction buffer 41, and if it is full, the instruction string is not stored in the instruction buffer 41.

The execution unit 91 receives an instruction decoded by the instruction decoder 9, executes the same, and generates a control signal according to a result of the execution of the instruction. The control signal is supplied to the fill unit 37. According to the control signal, the fill unit 37 determines whether or not an instruction string from the instruction cache 1 must be stored therein. If the control signal from the execution unit 91 indicates, for example, invalidity, the fill unit 37 does not store the instruction string in the instruction buffer 41.

FIG. 12 is a block diagram showing a processor having the instruction supply apparatus of the second embodiment. The processor has functional units (execution units) 11, a main memory 5, and a register file 13. The other elements of the processor are the same as those of FIG. 6 and are represented with the same reference marks.

The comparator 61 of this processor for determining which of the instruction cache 1 and branch target buffer 59 must be selected is smaller than the branch predictor 35 of the first embodiment in terms of hardware. Therefore, the second embodiment is effective to reduce the hardware quantity of the processor, thereby reducing the surface area and manufacturing cost of the processor.

The present invention is not limited to the first and second embodiments. For example, the number of branch target buffers is not limited to one but it may be two or more.

As explained above, the present invention provides a method of and an apparatus for supplying instructions to a processor, capable of simultaneously supplying a basic block of instructions serving as a branch source and a basic block of instructions serving as a branch target if there is a branch instruction, thereby improving instruction supply efficiency. This results in improving the performance of the processor. Further, the present invention reduces the hardware quantity of the processor and thus the surface area and manufacturing cost of the processor.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A method of supplying instruction strings to a processor, comprising the steps of:

accessing at a time in a parallel manner a first instruction memory for storing a plurality of continuous-address instruction strings, a second instruction memory for storing a plurality of branch instruction strings, and a branch predictor for predicting whether or not a branch is going to be taken, based on an instruction address inputted externally;

outputting from the first instruction memory a continuous-address instruction string and, at the same time, outputting from the second instruction memory a branch instruction string before a prediction is made by the branch predictor; and selecting either the continuous-address instruction string or the branch instruction string based on the prediction result, and supplying the selected instruction string to a decoder.

2. The method of claim 1, wherein selecting either the continuous address instruction string or the branch instruction string is carried out according to a control signal that indicates whether or not a predicted instruction string is present in either the first or second instruction memories.

3. The method of claim 2, further comprising the steps of:

inquiring whether or not there is a branch instruction string that includes a branch target instruction in the second instruction memory:

selecting and supplying a branch instruction string that includes the branch target instruction to the decoder if there is the branch target instruction in the second instruction memory;

inquiring whether or not there is a continuous-address instruction string that includes the branch target instruction in the first instruction memory if there is not the branch target instruction in the second instruction memory; and selecting and supplying a continuous-address instruction string that includes the branch target instruction to the decoder if there is the branch target instruction in the first instruction memory.

4. A method of supplying instruction strings to a processor, comprising the steps of:

storing a plurality of continuous-address instruction strings, each string having continuous addresses in a first instruction memory having a plurality of lines;

storing a plurality of branch instruction strings, each including a branch source instruction and a branch target instruction with discontinuous addresses in a second instruction memory having a plurality of lines;

reading a continuous-address instruction string and a branch instruction string from the first and second instruction memories, respectively, at a time in a parallel manner response to an instruction address inputted externally; and selecting one of the two instruction strings read out of the first and second instruction memories and supplying the selected one to an instruction decoder.

5. The method of claim 4, further comprising the step of:

starting a prediction of whether or not branching is going to be taken at the instruction address, simultaneously with the reading of the instruction strings from the first and second instruction memories, wherein the continuous-address instruction string and the branch instruction string have already been read out of the first and second instruction memories before the prediction is completed, and wherein if the prediction result indicates that branching is going to be taken, the branch instruction string read out of the second instruction memory is selected and supplied to the instruction decoder.

6. The method of claim 4, further comprising the step of:

inquiring whether or not a predicted branch instruction string is present in the second instruction memory, wherein if the predicted branch instruction string is present in the second instruction memory, the predicted branch instruction string read out of the second instruction memory is selected and supplied to the instruction decoder.

7. A method of supplying instruction strings to a processor, comprising the steps of:

storing a plurality of continuous-address instruction strings, each string having continuous addresses in a first instruction memory having a plurality of lines;

transferring strings of instructions from the first instruction memory to a fill unit;

rearranging the strings of instructions supplied from the first instruction memory in order of actual execution, without regard to the addresses, to produce branch instruction strings;

storing the rearranged branch instruction strings in a second instruction memory;

reading a continuous-address instruction string and a branch instruction from the first and second instruction memories, respectively, at a time in a parallel manner, in response to an instruction address input externally; and selecting either the continuous-address instruction string or the branch instruction string and supplying the selected one to an instruction decoder.

8. The method of claim 7, further comprising the steps of:

predicting whether or not branching is going to be taken, simultaneously with the reading of the continuous-address instruction string and the branch instruction string from the first and second instruction memories;

inquiring whether or not a target branch instruction string is stored in the second instruction memory at a predicted address;

causing the second instruction memory to output the target branch instruction string, if there is, to a selector;

selecting the branch instruction string unconditionally if branching is predicted; and supplying the branch instruction string to the instruction decoder.

9. An apparatus for supplying instruction strings to a processor, comprising:

a program counter for holding an address of an instruction to be executed;

a first instruction memory having a plurality of lines and connected to the program counter, each line storing a string of instructions having continuous addresses;

a second instruction memory having a plurality of lines and connected to the program counter, each line storing a string of instructions including a branch source instruction and a branch target instruction having discontinuous addresses;

a branch predictor connected to the program counter and for predicting whether or not a branch instruction is going to be executed;

a selector connected to the first and second instruction memories and the branch predictor in order to receive an output from the first instruction memory, an output from the second instruction memory, and a prediction result from the branch predictor, and for selecting one of the two outputs from the first and second instruction memories based on the prediction result supplied from the branch predictor; and an instruction decoder connected to the selector and for decoding the selected output supplied from the selector.

10. The apparatus of claim 9, further comprising:

a fill unit connected to the first and second instruction memories, the fill unit receiving strings of instructions with continuous addresses from the first instruction memory, rearranging the strings of instructions into a string of instructions in order of actual execution, but with discontinuous addresses, and transferring the rearranged instruction strings to the second instruction memory.

11. An apparatus for supplying instruction strings to a processor, comprising:

a program counter for holding an address of an instruction to be executed;

a first instruction memory connected to the program counter and having a plurality of lines, each line storing a string of instructions with continuous addresses;

a second instruction memory connected to the program counter and having a plurality of lines, the second instruction memory having a tag array for storing tags assigned to the respective lines, each line storing a string of instructions arranged in order of actual execution with discontinuous addresses;

a comparator connected to the program counter and the tag array of the second instruction memory and for comparing the address in the program counter with the tags in the tag array;

a selector connected to the first and second instruction memories and the comparator, the selector receiving outputs from the first and second instruction memories at a time in a parallel manner, then receiving a comparison result from the comparator, and selecting only one of the two outputs based on the comparison result; and an instruction decoder for receiving said one of the outputs selected by the selector and for decoding the received output.

12. The apparatus of claim 11, further comprising:

an execution unit for executing an instruction decoded by the instruction decoder and generating a control signal according to a result of the execution of the instruction; and a fill unit connected to the first and second instruction memories and the execution unit, the fill unit receiving an instruction string and the control signal from the first instruction memory and the execution unit, respectively, and determining whether or not the instruction string supplied from the first instruction memory is to be stored in the fill unit based on the control signal.

\* \* \* \* \*